(12) United States Patent
Aiura

(10) Patent No.: US 8,410,763 B2
(45) Date of Patent: Apr. 2, 2013

(54) CONTROLLER FOR BUCK AND BOOST CONVERTER

(75) Inventor: Masami Aiura, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 625 days.

(21) Appl. No.: 12/694,229

(22) Filed: Jan. 26, 2010

(65) Prior Publication Data

US 2011/0181264 A1 Jul. 28, 2011

(51) Int. Cl.
*G05F 1/24* (2006.01)
*G05F 1/40* (2006.01)

(52) U.S. Cl. ........................................ 323/259; 323/288

(58) Field of Classification Search .................. 323/222, 323/225, 259, 282, 284, 285, 288, 351
See application file for complete search history.

(56) References Cited

U.S. PATENT DOCUMENTS

| | | | |
|---|---|---|---|
| 4,952,884 A | 8/1990 | Tokumo et al. | |
| 5,402,060 A | 3/1995 | Erisman | |
| 5,748,428 A | 5/1998 | Kelley | |
| 5,949,224 A | 9/1999 | Barkaro | |
| 6,037,755 A | 3/2000 | Mao | |
| 6,166,527 A | 12/2000 | Dwelley | |
| 6,348,781 B1 | 2/2002 | Midya | |
| 7,202,644 B2 * | 4/2007 | Nitta et al. | 323/259 |
| 7,268,525 B2 | 9/2007 | Ishii | |
| 7,288,977 B2 | 10/2007 | Stanley | |
| 7,358,683 B2 | 4/2008 | LaGrave | |
| 7,522,432 B2 * | 4/2009 | Shimizu | 363/53 |
| 7,821,236 B2 * | 10/2010 | Hasegawa et al. | 323/222 |
| 7,843,177 B2 * | 11/2010 | Ho et al. | 323/222 |
| 2008/0246523 A1 | 10/2008 | Murakami | |
| 2008/0303502 A1 | 12/2008 | Haiplik | |

FOREIGN PATENT DOCUMENTS

| | | |
|---|---|---|
| JP | 2005110468 A | 4/2005 |
| JP | 2006238640 A | 9/2006 |

* cited by examiner

*Primary Examiner* — Jessica Han
(74) *Attorney, Agent, or Firm* — Charles Bergere

(57) ABSTRACT

A PWM controller for adjusting an output voltage of a buck and boost converter includes a first saw wave generator, which generates a first saw wave in accordance with the level of the output voltage. A first comparator coupled to the first saw wave generator compares the first saw wave with a first reference voltage and generates a first pulse. A peak hold circuit coupled to the first saw wave generator holds a peak value of the first saw wave. A second saw wave generator coupled to the peak hold circuit generates a second saw wave having a lower limit value that is the peak value of the first saw wave. A second comparator coupled to the second saw wave generator compares the second saw wave with the first reference voltage and generates a second pulse.

17 Claims, 6 Drawing Sheets

[ BOOST MODE ]

[ BUCK MODE ]

[ BOOST MODE ]

[ BUCK MODE ]

CONTROLLER FOR BUCK AND BOOST CONVERTER

BACKGROUND OF THE INVENTION

The present invention relates to a regulator, and more particularly, to a Pulse Width Modulation (PWM) controller for a buck and boost converter.

A regulator is used in a power supply circuit to obtain a desired output voltage from an input voltage. Examples of regulators include a step-up, or boost converter, a step-down, or buck converter, and a buck and boost converter. A boost converter generates output voltage that is higher than the input voltage. A buck converter generates output voltage that is lower than the input voltage. A buck and boost converter implements the functions of both a buck converter and a boost converter.

One of the important characteristics of a regulator is the linearity of the output voltage in order to obtain a stable voltage. Normally, the regulator includes an error amplifier, a pulse width modulation (PWM) controller, and an output transistor. The error amplifier monitors the output voltage of the regulator and generates an error voltage, which is in accordance with a difference between the output voltage and a reference voltage. The PWM controller generates a pulse having a variable duty ratio, which is in accordance with the error voltage. The pulse drives the output transistor and adjusts the level of the output voltage. That is, the value of the output voltage is dependent on the duty ratio of the pulse, which activates and deactivates the output transistor.

FIG. 1 shows an example of a conventional buck converter 10. The buck converter 10 includes an error amplifier 12, a PWM controller 14, and an output transistor 16. The output transistor 16 is formed by an NMOS transistor. The error amplifier 12 generates an error voltage VERR, which is in accordance with the difference between a feedback value VFB of the output voltage VOUT and a reference voltage VEREF. The PWM controller 14 includes a current source 18, a saw wave generator 20, and a comparator 22. The current source 18 generates current I1, which is in accordance with a reference voltage VPREF. The saw wave generator 20 receives a clock CL1, deactivates a transistor 24 to charge a capacitor 26 with the current I1, and activates the transistor 24 to discharge the capacitor 26. As shown in FIG. 2, the saw wave generator 20 repeats the charging and discharging of the capacitor 26 in predetermined cycles and generates a saw wave VS1, which has a constant voltage amplitude VP1, based on the current I1. The comparator 22 compares the saw wave VS1 with the error voltage VERR to generate a pulse P1, which drives the output transistor 16. When the error voltage VERR is greater than the saw wave VS1, the pulse P1 has an H logic level (or active high), which activates the output transistor 16.

In the buck converter 10 of FIG. 1, the duty ratio D1 of the pulse P1 may be expressed by the equation shown below.

$$D1 = VERR/VP1 \quad \text{Equation 1}$$

Accordingly, the transfer function of the buck converter 10 may be expressed by equation 2 when using equation 1.

$$VOUT = VIN \times D1 = VIN \times VERR/VP1 \quad \text{Equation 2}$$

In equation 2, VIN/VP1 may be regarded as a constant. Accordingly, the output voltage VOUT of the buck converter 10 varies linearly in accordance with the error voltage VERR.

FIG. 3 shows an example of a conventional boost converter 30. The boost converter 30 includes an error amplifier 32, a PWM controller 34, and an output transistor 36. The output transistor 36 is formed by an NMOS transistor. In the boost converter 30, a current source 38 of the PWM controller 34 generates a current I2 in accordance with an error voltage VERR generated by the error amplifier 32. A saw wave generator 40 controls a transistor 44 with a clock CL2 and to repeatedly charge and discharge a capacitor 46 in predetermined cycles.

Referring to FIG. 4, a saw wave VS2 is generated by the saw wave generator 40. The saw wave VS2 has a variable voltage amplitude VP2, based on the current I2, which varies in accordance with the error voltage VERR. A comparator 42 compares the saw wave VS2 with a reference voltage VPREF to generate a pulse P2, which drives the output transistor 36. When the voltage of the saw wave VS2 is higher than the reference voltage VPREF, the pulse P2 has an H logic level (or active high), which activates the output transistor 36.

In the boost converter 30 of FIG. 3, the duty ratio D2 of the pulse P2 may be expressed by equation 3 shown below.

$$D2 = 1 - VPREF/VP2 \quad \text{Equation 3}$$

Accordingly, the transfer function of the boost converter 30 may be expressed with equation 4 (below) when using equation 3.

$$VOUT = VIN/(1-D2) = VIN \times VP2/VPREF \quad \text{Equation 4}$$

In equation 4, VIN/VPREF may be regarded as a constant. Further, VP2 is a value proportional to the error voltage VERR. Thus, the output voltage VOUT of the boost converter 30 varies linearly in accordance with the error voltage VERR.

Accordingly, the output voltage VOUT of the buck converter 10 shown in FIG. 1 and the output voltage VOUT of the boost converter 30 shown in FIG. 3 are both linearly controlled. However, the linear control differs between the PWM controller 14 of the buck converter 10 and the PWM controller 34 of the boost converter 30. Thus, when applying the PWM controller 34 (equation 3) to the buck converter 10 (equation 2), the output voltage VOUT cannot be linearly controlled. Likewise, when applying the PWM controller 14 (equation 1) to the boost converter 30 (equation 4), the output voltage VOUT cannot be linearly controlled. Accordingly, the PWM controller 34 is not suitable for use in a buck converter, and the PWM controller 14 is not suitable for use in a boost converter. That is, the conventional PWM controllers 14 and 34, which perform linear control differently, are not suitable for use in a combined buck and boost converter.

It would be advantageous to have a PWM controller suitable for linear output control in a buck and boost converter.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE INVENTION

Figure 1:
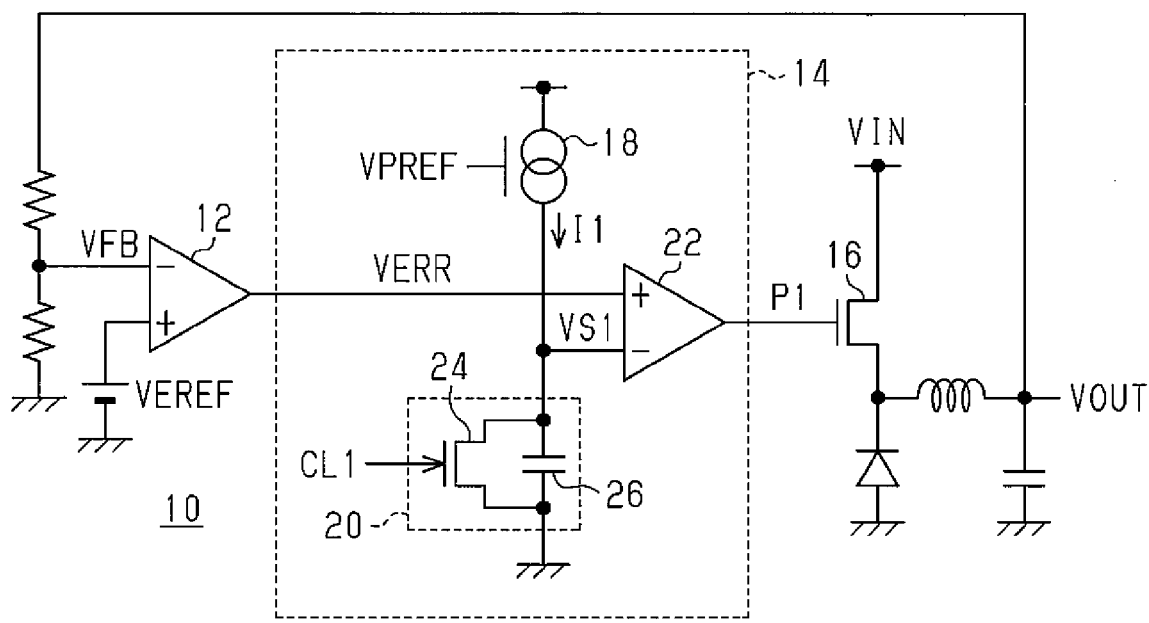
FIG. 1 is a schematic circuit diagram of a conventional buck converter.
Figure 2:
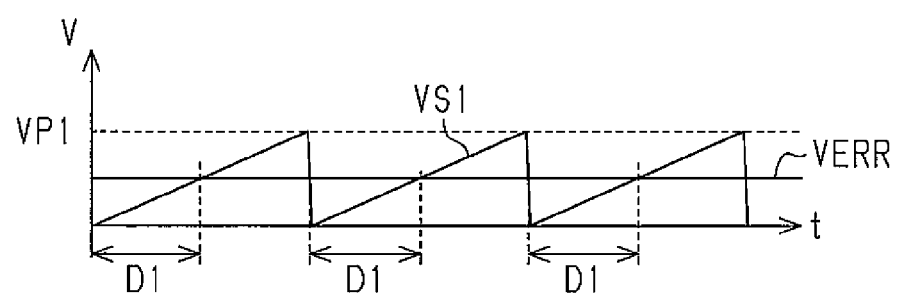
FIG. 2 is a waveform diagram showing the PWM operation of the buck converter of FIG. 1.
Figure 3:
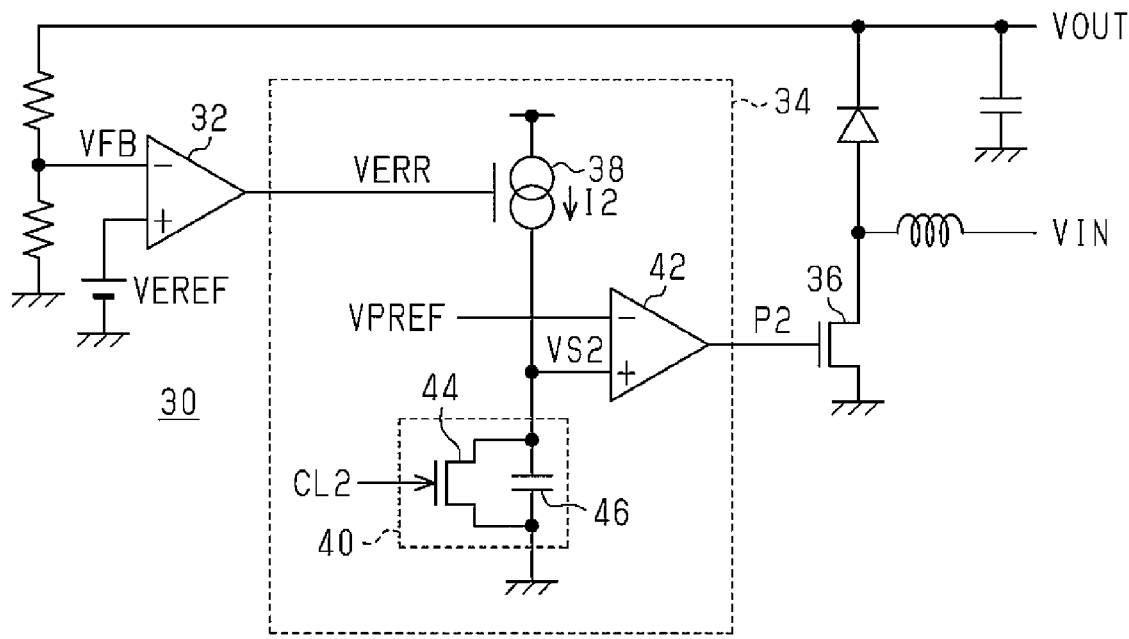
FIG. 3 is a schematic circuit diagram of a conventional boost converter.
Figure 4:
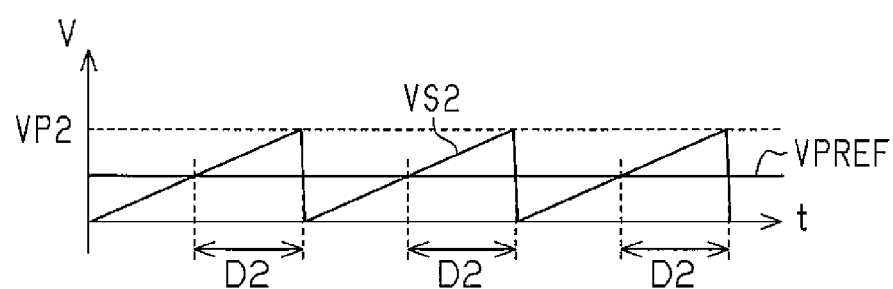
FIG. 4 is a waveform diagram showing the PWM operation of the boost converter of FIG. 3.

The present invention provides a PWM controller applicable to a buck and boost converter and capable of linearly controlling output voltage.

Unless stated otherwise, terms such as "first" and "second" are used to arbitrarily distinguish between the elements such terms describe. Thus, these terms are not necessarily intended to indicate temporal or other prioritization of such elements. In addition, the word "coupled" refers to elements being in electrical communication with each other, whether directly connected e.g., via wires, or in some other manner.

One aspect of the present invention is a PWM controller for adjusting an output voltage of a buck and boost converter. The PWM controller includes a first saw wave generator, which generates a first saw wave in accordance with the level of the output voltage. A first comparator, electrically coupled to the first saw wave generator, compares the first saw wave with a first reference voltage and generates a first pulse. A peak hold circuit electrically coupled to the first saw wave generator holds a peak value of the first saw wave. A second saw wave generator, electrically coupled to the peak hold circuit, generates a second saw wave having a lower limit value that is the peak value of the first saw wave. A second comparator, electrically coupled to the second saw wave generator, compares the second saw wave with the first reference voltage and generates a second pulse.

A further aspect of the present invention is a PWM controller for adjusting an output voltage of a buck and boost converter. The PWM controller includes a first saw wave generator, which generates a first saw wave including a first waveform portion formed in accordance with the level of the output voltage and a second waveform portion having a lower limit value that is a peak value of the first waveform portion of the first saw wave. A first comparator, electrically coupled to the first saw wave generator, compares the first saw wave with a first reference voltage and generates a first pulse. A second saw wave generator generates a second saw wave including a first waveform portion formed in accordance with the level of the output voltage and a second waveform portion having a lower limit value that is a peak value of the first waveform portion of the second saw wave. The first waveform portion of the first saw wave is generated when the second waveform portion of the second saw wave is generated, and the first waveform portion of the second saw wave is generated when the second waveform portion of the first saw wave is generated. A second comparator is electrically coupled to the second saw wave generator, which compares the second saw wave with the first reference voltage and generates a second pulse.

Yet another aspect of the present invention is a buck and boost converter for generating an output voltage from an input voltage. The buck and boost converter includes a first output transistor. A second output transistor is electrically coupled to the first output transistor. An error amplifier, electrically coupled to the first and second output transistors, generates an error voltage in accordance with the level of the output voltage. A PWM controller, electrically coupled to the error amplifier, generates a first control pulse for driving the first output transistor and a second control pulse for driving the second output transistor. The PWM controller generates the first control pulse based on the error voltage and a first reference voltage, and the PWM controller generates the second control pulse based on the error voltage, the first reference voltage, and a second reference voltage.

Figure 5:
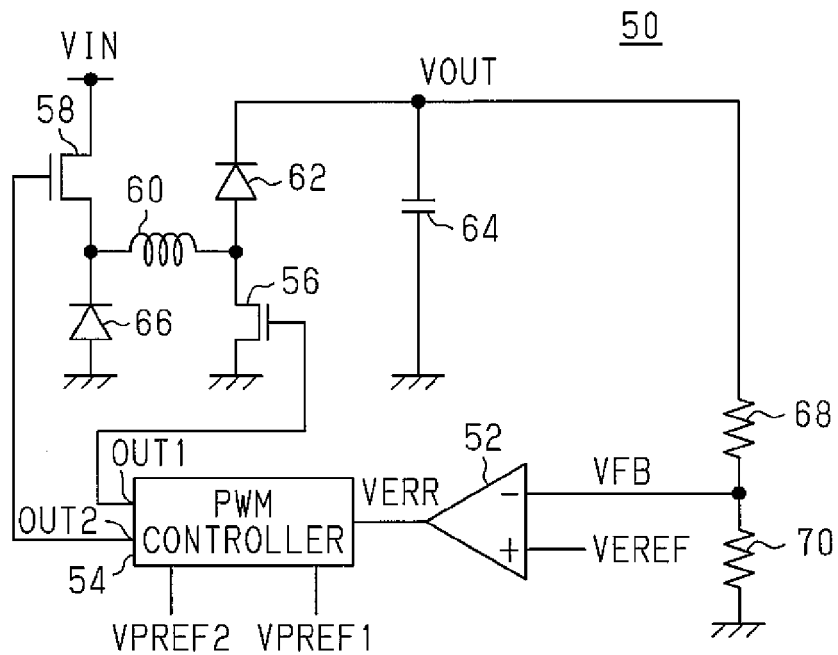
FIG. 5 is a schematic circuit diagram of a buck and boost converter in accordance with an embodiment of the present invention.

A buck and boost converter 50 in accordance with an embodiment of the present invention will now be discussed. FIG. 5 is a schematic circuit diagram of the buck and boost converter 50. The converter 50 generates an output voltage VOUT from an input voltage VIN. The buck and boost converter 50 implements a step-up, or boost mode function, which generates a higher output voltage VOUT than the input voltage VIN, and a step-down, or buck converter function, which generates a lower output voltage VOUT than the input voltage VIN.

The buck and boost converter 50 includes an error amplifier 52, a PWM controller 54, a boost control first output transistor 56, and a buck control second output transistor 58. The first and second output transistors 56 and 58 are formed by, for example, NMOS transistors. The first output transistor 56 includes a gate coupled to the PWM controller 54, a source coupled to ground, and a drain coupled to one end of a coil 60 and an anode of a first diode 62. The first diode 62 has a cathode coupled via a capacitor 64 to ground. A node between the first diode 62 and the capacitor 64 is coupled to an output terminal of the buck and boost converter 50. The second output transistor 58 includes a gate coupled to the PWM controller 54, a source coupled to the other end of the coil 60 and a cathode of a second diode 66, and a drain that receives the input voltage VIN. Accordingly, the source of the second output transistor 58 is coupled to an output terminal of the buck and boost converter 50 via the coil 60 and the first diode 62. The second diode 66 has an anode coupled to ground. The output terminal of the buck and boost converter 50 is coupled to ground via resistors 68 and 70.

The error amplifier 52 includes an inversion input terminal, which receives a feedback value VFB of the output voltage VOUT generated at a node between the resistors 68 and 70, and a non-inversion input terminal, which receives a reference voltage VEREF compared with the feedback value VFB. The error amplifier 52 generates an error voltage VERR, which is in accordance with the error between the feedback value VFB and the reference voltage VEREF, namely, the difference between the output voltage VOUT and a target voltage. Accordingly, the error voltage VERR is generated in accordance with the level of the output voltage VOUT.

The PWM controller 54 includes an input terminal, which receives the error voltage VERR from the error amplifier 52, a first reference terminal, which receives a first reference voltage VPREF1, and a second reference terminal, which receives a second reference voltage VPREF2. The first reference voltage VPREF1 may be the same as the reference voltage VEREF, which is supplied to the error amplifier 52. Further, the second reference voltage VPREF2 may be the same as the first reference voltage VPREF1. The first and second reference voltages VPREF1 and VPREF2 may be generated to be proportional to the input voltage VIN. However, the reference voltage VEREF must be fixed. The PWM controller 54 further includes a first output terminal OUT1, which outputs a first control pulse for driving the first output transistor 56, and a second output terminal OUT2, which outputs a second control pulse for driving the second output transistor 58.

Figure 6:
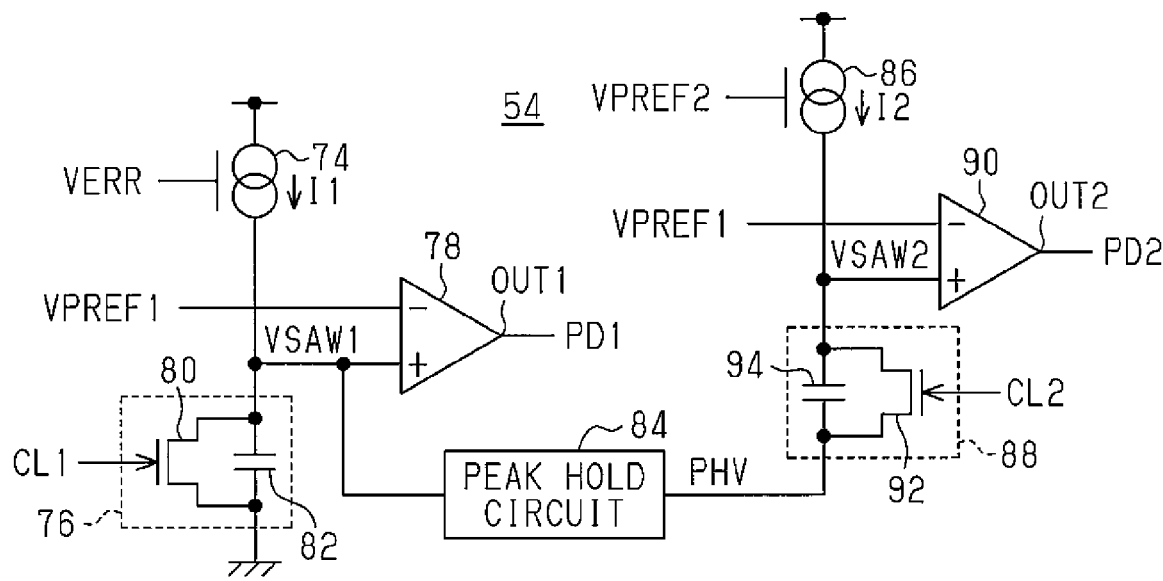
FIG. 6 is a schematic circuit diagram of a first embodiment of a PWM controller applied to the buck and boost converter of FIG. 5.

In the first embodiment, referring to FIG. 6, the PWM controller 54 generates a first pulse PD1 (first control pulse) and a second pulse PD2 (second control pulse), which are respectively output from the first and second output terminals OUT1 and OUT2. The PWM controller 54 varies the duty ratio D1 of the first pulse PD1 in accordance with the error voltage VERR to control the activation time of the first output transistor 56. Further, the PWM controller 54 varies the duty ratio D2 of the second pulse PD2 in accordance with the error voltage VERR to control the activation time of the second output transistor 58.

In the buck and boost converter 50, when the input voltage VIN is low (e.g., when the voltage of a rechargeable battery is low) or when a load driven by the output voltage VOUT temporarily requires a large amount of power (e.g., during system start-up), the output voltage VOUT is controlled in a boost mode. In the boost mode, the PWM controller 54 fixes the duty ratio D2 of the second pulse PD2 at 100% and keeps the second output transistor 58 activated. In this state, the PWM controller 54 adjusts the duty ratio D1 of the first pulse PD1 to control the activation time of the first output transistor 56. For example, when the difference between the feedback value VFB of the output voltage VOUT and the reference voltage VEREF is large (VFB<VEREF) in the boost mode, the PWM controller 54 sets the duty ratio D1 of the first pulse PD1 to relatively lengthen the activation time of the first output transistor 56. This increases the peak value of the current accumulated in the coil 60 and readily increases the output voltage VOUT to the desired level.

When the power consumption of the load is low (e.g., when the load is light) in a state in which the input voltage VIN is relatively high (e.g., when the rechargeable battery is fully charged), the difference between the feedback value VFB of the output voltage VOUT and the reference voltage VEREF is small. In such a state, the buck and boost converter 50 operates in a buck mode. In the buck mode, the PWM controller 54 fixes the duty ratio D1 of the first pulse PD1 at 0% and keeps the first output transistor 56 deactivated. In this state, the PWM controller 54 adjusts the duty ratio D2 of the second pulse PD2 to control the activation time of the second output transistor 58. For example, when the feedback value VFB of the output voltage VOUT becomes greater than the reference voltage VEREF, the PWM controller 54 shortens the activation time of the second output transistor 58 to decrease the output voltage VOUT. Further, when the feedback value VFB of the output voltage VOUT becomes lower than the reference voltage VEREF, the PWM controller 54 lengthens the activation time of the second output transistor 58 to increase the output voltage VOUT.

The buck and boost converter 50 automatically switches between the boost mode and the buck mode in accordance with the present levels of the input voltage VIN and output voltage VOUT and the present load conditions. The switching timing is determined by, for example, the value of the reference voltage VEREF or the values of the resistors 68 and 70.

The circuit configuration of the PWM controller 54 of the first embodiment will now be discussed with reference to FIG. 6. The PWM controller 54 includes a current source 74, a saw wave generator 76, and a comparator 78. The current source 74 generates current I1, which is in accordance with the error voltage VERR from the error amplifier 52. The saw wave generator 76 includes a transistor 80, which is controlled by a clock CL1, and a capacitor 82, which is coupled between the current source 74 and ground. The saw wave generator 76 deactivates the transistor 80 to charge the capacitor 82 and activates the transistor 80 to discharge the capacitor 82. The saw wave generator 76 repeats the charging and discharging of the capacitor 82 in predetermined cycles to generates a first saw wave VSAW1, which has a variable voltage amplitude VPEAK1, based on the current I1 (error voltage VERR). That is, the first saw wave VSAW1 has a gradient that varies in accordance with the error voltage VERR.

The comparator 78 includes an inversion input terminal, which receives the first reference voltage VPREF1, a non-inversion input terminal, which receives the first saw wave VSAW1, and an output terminal, which is coupled to the first output terminal OUT1 of the PWM controller 54. The comparator 78 generates the first pulse PD1 having the duty ratio D1 based on the comparison of the first saw wave VSAW1 and the first reference voltage VPREF1. When the voltage of the first saw wave VSAW1 is higher than the first reference voltage VPREF1, the first pulse PD1 has an H logic level (or active high), which activates the first output transistor 56.

The PWM controller 54 further includes a peak hold circuit 84, which is coupled to an output node of the saw wave generator 76 and holds a peak voltage (maximum voltage) PHV of the first saw wave VSAW1. The peak voltage PHV is the maximum voltage (VPEAK1) to which the capacitor 82 is charged in accordance with the error voltage VERR.

The PWM controller 54 also includes a current source 86, a saw wave generator 88, and a comparator 90. The current source 86 generates constant current I2, which is in accordance with the second reference voltage VPREF2. The saw wave generator 88 includes a transistor 92, which is controlled by a clock CL2, and a capacitor 94, which is coupled between the current source 86 and the peak hold circuit 84. The saw wave generator 88 deactivates the transistor 92 to charge the capacitor 94 with the current I2 and activates the transistor 92 to discharge the capacitor 94. In such states, the saw wave generator 88 holds a potential of one end of the capacitor 94, which is coupled to the output node of the peak hold circuit 84, at the same potential as the peak voltage PHV (VPEAK1) of the first saw wave VSAW1. This end of the capacitor 94 is electrically coupled via the transistor 92 to the other end of the capacitor 94. Accordingly, the capacitor 94 holds the peak voltage PHV as a lower limit value during discharging and increase the charge voltage from the peak voltage PHV during charging. The saw wave generator 88 repeats the charging and discharging of the capacitor 94 in predetermined cycles and generates the second saw wave VSAW2, which has a constant amplitude Am, from the peak voltage PHV, based on the current I2 (second reference voltage VPREF2). Accordingly, a peak voltage VPEAK2 of the second saw wave VSAW2 is expressed by the equation shown below.

$$VPEAK2 = PHV + Am \qquad \text{Equation 5}$$

The peak voltage PHV (VPEAK1) of the first saw wave VSAW1 varies in accordance with the error voltage VERR. However, the amplitude Am is constant regardless of the error voltage VERR. Accordingly, the second saw wave VSAW2 has a lower limit value shifted by a predetermined offset, which corresponds to the peak voltage PHV (VPEAK1) of the first saw wave VSAW1, and is varied from the lower limit value by the constant amplitude Am. The peak voltage PHV (VPEAK1) is proportional to the error voltage VERR. Thus, the peak voltage VPEAK2 of the second saw wave VSAW2 is also proportional to the error voltage VERR.

The comparator 90 includes an inversion input terminal, which receives the first reference voltage VPREF1, a non-inversion input terminal, which receives the second saw wave VSAW2, and an output terminal, which is coupled to the second output terminal OUT2 of the PWM controller 54. The comparator 90 generates the second pulse PD2 of the duty ratio D2 based on the comparison of the second saw wave VSAW2 and the first reference voltage VPREF1. When the voltage of the second saw wave VSAW2 is higher than the first reference voltage VPREF1, the second pulse PD2 has an H logic level (or active high), which activates the second output transistor 58.

Figure 7:
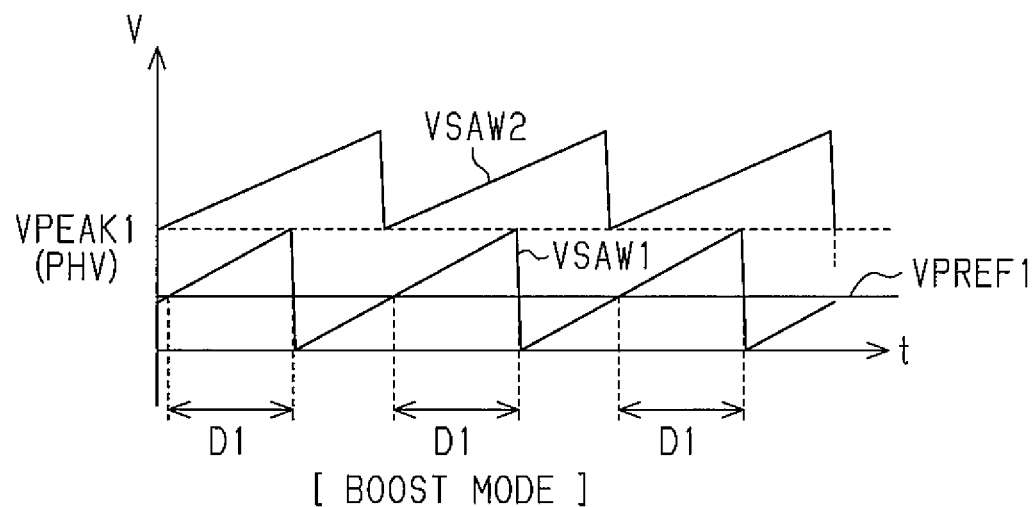
FIG. 7 is a waveform diagram showing the operation of the PWM controller of FIG. 6 in a boost mode.

FIG. 7 shows the operation of the PWM controller 54 in the boost mode. In the boost mode, the PWM controller adjusts the amplitude of the first saw wave VSAW1, that is, the duty ratio D1 of the first pulse PD1, to control the activation and deactivation of the first output transistor 56. The peak hold circuit 84 holds the lower limit value of the second saw wave VSAW2 at the peak voltage PHV (VPEAK1) of the first saw wave VSAW1. Accordingly, the duty ratio D2 of the second pulse PD2 is fixed at 100% in the boost mode, and the second output transistor 58 is activated throughout this period. In the boost mode, the duty ratio D1 of the first pulse PD1 is expressed by the equation shown below.

$$D1 = 1 - VPREF1/VPEAK1 \quad \text{Equation 6}$$

Accordingly, the transfer function of the buck and boost converter 50 during the boost mode is expressed by the equation shown below when using equation 6.

$$VOUT = VIN/(1-D1) = VIN \times VPEAK1/VPREF1 \quad \text{Equation 7}$$

In equation 7, VIN/VPREF1 may be regarded as a constant. Further, VPEAK1 is a value proportional to the error voltage VERR. Thus, the output voltage VOUT in the boost mode varies linearly in accordance with the error voltage VERR.

Figure 8:
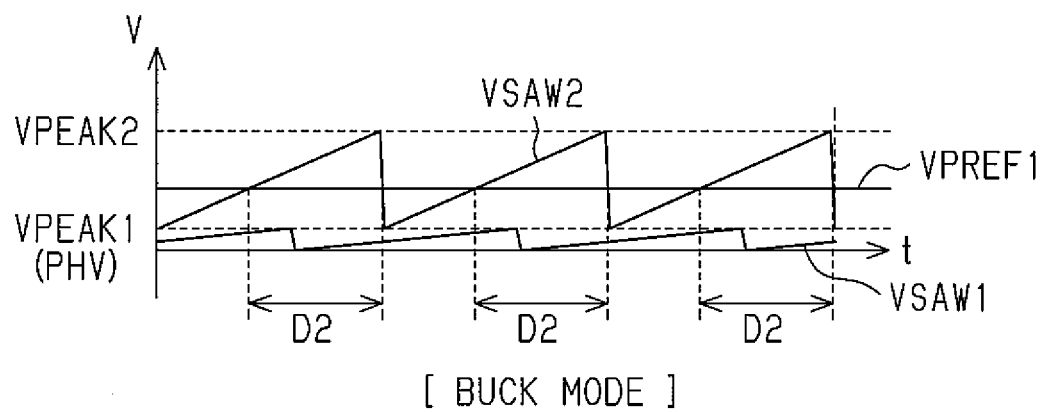
FIG. 8 is a waveform diagram showing the operation of the PWM controller of FIG. 6 in a buck mode.

FIG. 8 shows the operation of the PWM controller 54 in the buck mode. As described above, when the buck and boost converter 50 is in the buck mode, the difference between the feedback value VFB of the output voltage VOUT and the reference voltage VEREF is small. Thus, the error voltage VERR is also small. Accordingly, the voltage of the first saw wave VSAW1 does not exceed the first reference voltage VPREF1 (otherwise, the first reference voltage VPREF1 is set accordingly). Hence, in the buck mode, the duty ratio D1 of the first pulse PD1 is fixed at 0%, and the first output transistor 56 is deactivated throughout this period. The peak hold circuit 84 holds the lower limit value of the second saw wave VSAW2 at the peak voltage PHV (VPEAK1) of the first saw wave VSAW1. In the buck mode, the PWM controller 54 adjusts the duty ratio D2 of the second pulse PD2 in accordance with the peak voltage PHV to control the activation and deactivation of the second output transistor 58. Further, in the buck mode, the duty ratio D2 of the second pulse PD2 is expressed by the equation shown below.

$$D2 = VERR1/Am \quad \text{Equation 8}$$

In equation 8, Am is the constant amplitude value of the second saw wave VSAW2, and VERR1 may be expressed by VPEAK2−VPREF1. In the same manner as in equation 5, VPEAK2 is proportional to the error voltage VERR. Thus, VERR1, i.e., VPEAK2−VPREF1, is also proportional to the error voltage VERR. The transfer function of the buck and boost converter 50 during the buck mode is expressed by the equation shown below when using equation 8.

$$VOUT = VIN \times D2 = VIN \times VERR1/Am \quad \text{Equation 9}$$

In equation 9, VIN/Am may be regarded as a constant. Accordingly, in the buck mode, the output voltage VOUT varies linearly in accordance with the error voltage VERR.

The buck and boost converter 50 incorporating the PWM controller 54 of the first embodiment has, among other thing, the advantages described below. The amplitude of only the boost control first saw wave VSAW1 is varied by the error voltage VERR, and the amplitude of the buck control second saw wave VSAW2 remains constant regardless of the error voltage VERR. As a result, the output voltage VOUT is linearly controlled in both the boost mode and the buck mode. Accordingly, the PWM controller 54 of the first embodiment is suitable for use in a buck and boost converter.

Figure 9:
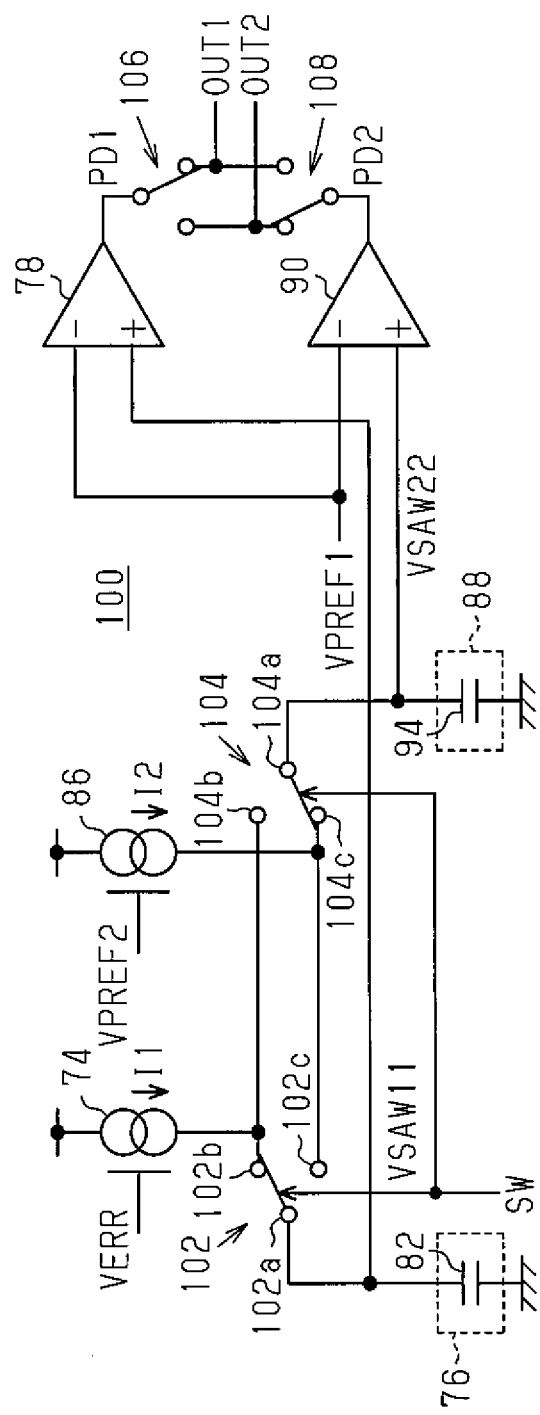
FIG. 9 is a schematic circuit diagram of a PWM controller, in accordance with another embodiment of the present invention, applied to the buck and boost converter of FIG. 5.

FIG. 9 is a schematic circuit diagram showing a PWM controller 100 according to a second embodiment, which is applied to the buck and boost converter 50 of FIG. 5. The PWM controller 100 is used in lieu of the PWM controller 54 of the first embodiment.

Like the PWM controller 54 of the first embodiment, the PWM controller 100 includes the current source 74, the saw wave generator 76 (FIG. 9 shows only the capacitor 82), the comparator 78, the current source 86, the saw wave generator 88 (FIG. 9 shows only the capacitor 94), and the comparator 90. The PWM controller 100 further includes first and second switches 102 and 104, which are controlled by a switching signal SW.

The first switch 102 includes a common terminal 102a, which is coupled to the capacitor 82, a first switching terminal 102b, which is coupled to the current source 74, and a second switching terminal 102c, which is coupled to the current source 86. When the common terminal 102a is coupled to the first switching terminal 102b, the capacitor 82 is charged by the current I1 from the current source 74. When the common terminal 102a is coupled to the second switching terminal 102c, the capacitor 82 is charged by the current I2 from the current source 86.

Figure 10:
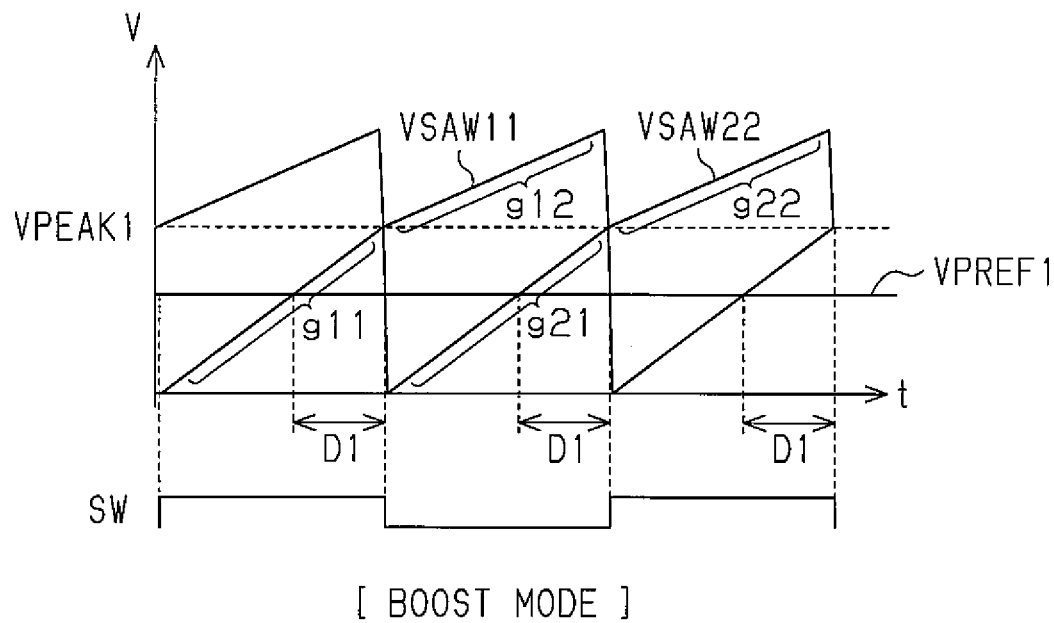
FIG. 10 is a waveform diagram showing the operation of the PWM controller of FIG. 9 in a boost mode.

In the same manner as in the first embodiment, the saw wave generator 76 controls the charging and discharging of the capacitor 82 with the clock CL1 and the transistor 80 (neither shown). In the second embodiment, however, the clock CL1 has a cycle that is two times longer than that of the first embodiment. The first switching terminal 102b and the second switching terminal 102c are switched every half cycle of the clock CL1. The saw wave generator 76 charges the capacitor 82 with the current I1 in the first half cycle of the clock CL1 and charges the capacitor 82 with the current I2 in the next half cycle of the clock CL1. Then, the saw wave generator 76 discharges the capacitor 82. By repeating the charging and discharging of the capacitor 82, the saw wave generator 76 generates a first saw wave VSAW11. As shown in FIG. 10, the first saw wave VSAW11 includes a first waveform portion g11, which is formed in accordance with the error voltage VERR (i.e., the level of the output voltage VOUT) and a second waveform portion g12, the lower limit value of which is the peak voltage VPEAK1 of the first waveform portion g11. More specifically, the first waveform portion g11 of the first saw wave VSAW11 has a gradient varied in accordance with the current I1, or the error voltage VERR. The second waveform portion g12 of the first saw wave VSAW11 has a constant gradient based on the current I2, or the second reference voltage VPREF2.

The second switch 104 includes a common terminal 104a, which is coupled to the capacitor 94 (and the non-inversion input terminal of the comparator 90), a first switching terminal 104b, which is coupled to the current source 74, and a second switching terminal 104c, which is coupled to the current source 86. When the common terminal 104a is coupled to the first switching terminal 104b, the capacitor 94 is charged by the current I1 from the current source 74. When the common terminal 104a is coupled to the second switching terminal 104c, the capacitor 94 is charged by the current I2 from the current source 86.

In the same manner as in the first embodiment, the saw wave generator 88 controls the charging and discharging of the capacitor 94 with the clock CL2 and the transistor 92 (neither shown). In the second embodiment, however, the clock CL2 has a cycle that is two times longer than that of the first embodiment. The first switching terminal 104b and the second switching terminal 104c are switched every half cycle of the clock CL2. When the common terminal 102a of the first switch 102 is coupled to the first switching terminal 102b thereof, the common terminal 104a of the second switch 104 is coupled to the second switching terminal 104c thereof. Accordingly, the saw wave generator 88 charges the capacitor 94 with the current I2 when the capacitor 82 is being charged by the current I1. When the common terminal 102a of the first switch 102 is coupled to the second switching terminal 102c thereof, the common terminal 104a of the second switch 104 is coupled to the first switching terminal 104b thereof. Accordingly, the saw wave generator 88 charges the capacitor 94 with the current I1 when the capacitor 82 is being charged by the current I2.

After the charging with the current I1 and the charging with the current I2, the saw wave generator 88 discharges the capacitor 94. By repeating the charging and discharging of the capacitor 94, the saw wave generator 88 generates a second saw wave VSAW22. As shown in FIG. 10, the second saw wave VSAW22 includes a first waveform portion g21, which is formed in accordance with the error voltage VERR (i.e., the level of the output voltage VOUT) and a second waveform portion g22, the lower limit value of which is the peak voltage VPEAK1 of the first waveform portion g21. More specifically, the first waveform portion g21 of the second saw wave VSAW22 has a gradient varied in accordance with the current I1, or the error voltage VERR. The second waveform portion g22 of the second saw wave VSAW22 has a constant gradient based on the current I2, or the second reference voltage VPREF2. Thus, the first saw wave VSAW11 and the second saw wave VSAW22 have identical waveforms although they are formed in different charging-discharging cycles.

The comparator 78 generates the first pulse PD1 based on the comparison of the first saw wave VSAW11 and the first reference voltage VPREF1. The comparator 90 generates the second pulse PD2 based on the comparison of the second saw wave VSAW22 and the first reference voltage VPREF1.

The PWM controller 100 further includes third and fourth switches 106 and 108, which form a synthesizer. The third and fourth switches 106 and 108 are similar to the first and second switches 102 and 104 and controlled by the switching signal SW. When the common terminal 102a of the first switch 102 is coupled to the first switching terminal 102b thereof, the output terminal of the comparator 78, which outputs the first pulse PD1, is coupled to the first output terminal OUT1 of the PWM controller 100 through the third switch 106. In this state, the output terminal of the comparator 90, which outputs the second pulse PD2, is coupled to the second output terminal OUT2 of the PWM controller 100 through the fourth switch 108. When the common terminal 102a of the first switch 102 is coupled to the second switching terminal 102c thereof, the output terminal of the comparator 78 is coupled to the second output terminal OUT2 of the PWM controller 100 through the third switch 106. In this state, the output terminal of the comparator 90 is coupled to the first output terminal OUT1 of the PWM controller 100 through the fourth switch 108. Accordingly, the PWM controller 100 alternately outputs the first and second pulses PD1 and PD2 from the first and second output terminals OUT1 and OUT2 based on the switching of the switches 102, 104, 106, and 108.

FIG. 10 shows the operation of the PWM controller 100 in the boost mode. In the boost mode, based on the first waveform portion g11 of the first saw wave VSAW11, which is generated when charging the capacitor 82 with the current I1, and the first waveform portion g21 of the second saw wave VSAW22, which is generated when charging the capacitor 94 with the current I1, the PWM controller 100 combines the first pulse PD1 and the second pulse PD2 to generate a first synthesized pulse (first control pulse). The first synthesized pulse has a duty ratio D1 varied in accordance with the error voltage VERR. The PWM controller 100 uses the first synthesized pulse to control the activation and deactivation of the first output transistor 56 in the boost mode.

Further, based on the second waveform portion g12 of the first saw wave VSAW11, which is generated when charging the capacitor 82 with the current I2, and the second waveform portion g22 of the second saw wave VSAW22, which is generated when charging the capacitor 94 with the current I2, the PWM controller 100 combines the first pulse PD1 and the second pulse PD2 to generate a second synthesized pulse (second control pulse). The second synthesized pulse has a duty ratio D2 fixed at 100%. The PWM controller 100 uses the second synthesized pulse to keep the second output transistor 58 activated throughout the boost mode.

The duty ratio D1 of the first synthesized pulse generated in the boost mode is expressed by equation 6 in the same manner as in the first embodiment. Accordingly, in the PWM controller 100 of the second embodiment, the output voltage VOUT in the boost mode also varies linearly in accordance with the error voltage VERR (refer to equation 7).

Figure 11:
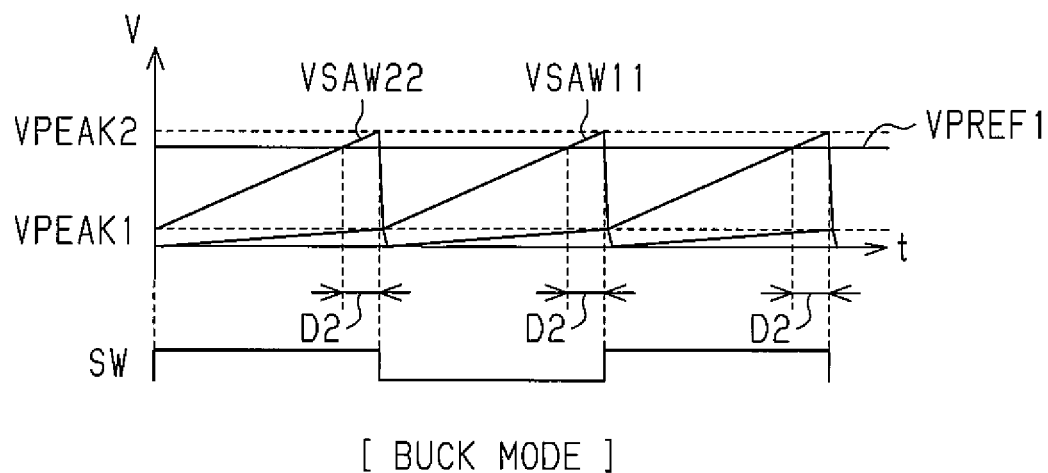
FIG. 11 is a waveform diagram showing the operation of the PWM controller of FIG. 9 in a buck mode.

FIG. 11 shows the operation of the PWM controller 100 in the buck mode. In the buck mode, based on the first waveform portion g11 of the first saw wave VSAW11, which is generated when charging the capacitor 82 with the current I1, and the first waveform portion g21 of the second saw wave VSAW22, which is generated when charging the capacitor 94 with the current I1, the PWM controller 100 combines the first pulse PD1 and the second pulse PD2 to fix the duty ratio D1 of the first synthesized pulse at 0%. The PWM controller 100 uses the first synthesized pulse to keep the first output transistor 56 deactivated throughout the buck mode.

Further, based on the second waveform portion g12 of the first saw wave VSAW11, which is generated when charging the capacitor 82 with the current I2, and the second waveform portion g22 of the second saw wave VSAW22, which is generated when charging the capacitor 94 with the current I2, the PWM controller 100 combines the first pulse PD1 and the second pulse PD2 to vary the duty ratio D2 of the second synthesized pulse. The PWM controller 100 uses the second synthesized pulse to control the activation and deactivation of the second output transistor 58.

The second waveform portions g12 and g22 (gradient portions generated when charging is performed with the current I2) of the first and second saw waves VSAW11 and VSAW22 have a lower limit value shifted by a predetermined offset, which corresponds to the peak voltage VPEAK1 of each of the first waveform portions g11 and g21 (gradient portions generated when charging is performed with the current I1), and are varied from the lower limit value by a constant gradient. Accordingly, the duty ratio D2 of the second synthesized pulse in the buck mode is expressed by equation 8 in the same manner as in the first embodiment. Thus, in the PWM controller 100 of the second embodiment, the output voltage VOUT in the buck mode also varies linearly in accordance with the error voltage VERR (refer to equation 9).

The buck and boost converter 50 incorporating the PWM controller 100 of the second embodiment has, among other things, the advantages described below. The boost control first synthesized pulse is generated based on the first waveform portions g11 and g21 of the first and second saw waves VSAW11 and VSAW22. The buck control second synthesized pulse is generated based on the second waveform portions g12 and g22 of the first and second saw waves VSAW11 and VSAW22. In this case, the gradient of each of only the first formation portions g11 and g21 is varied by the error voltage VERR, and the gradient of each of the second waveform portions g12 and g22 remains constant regardless of the error voltage VERR. As a result, the output voltage VOUT is linearly controlled in both the boost mode and the buck mode. Accordingly, the PWM controller 100 of the second embodiment is suitable for use in a buck and boost converter.

It should be apparent to those skilled in the art that the present invention may be embodied in many other specific forms without departing from the spirit or scope of the invention. Particularly, it should be understood that the present invention may be embodied in the following forms.

The first and second output transistors 56 and 58 may be PMOS transistors. In this case, the outputs of the comparators 78 and 90 are inverted. The first and second output transistors 56 and 58 may also be bipolar transistors. The configuration of the buck and boost converter 50 is not limited to that shown in FIG. 5. The switches 106 and 108 may be logic gates that function in the same manner as the switches 106 and 108. The error amplifier 52 is not limited to the structure described above as long as it outputs the control signal in accordance with an error.

The present examples and embodiments are to be considered as illustrative and not restrictive, and the invention is not to be limited to the details given herein, but may be modified within the scope and equivalence of the appended claims.

What is claimed is:

1. A Pulse Width Modulation (PWM) controller for adjusting an output voltage of a buck and boost converter, the PWM controller comprising:
    a first saw wave generator, which generates a first saw wave in accordance with the level of the output voltage;
    a first comparator coupled to the first saw wave generator for comparing the first saw wave with a first reference voltage and generating a first pulse;
    a peak hold circuit coupled to the first saw wave generator, which holds a peak value of the first saw wave;
    a second saw wave generator coupled to the peak hold circuit for generating a second saw wave having a lower limit value that is the peak value of the first saw wave; and
    a second comparator coupled to the second saw wave generator for comparing the second saw wave with the first reference voltage and generating a second pulse.

2. The PWM controller of claim 1, wherein the first saw wave has an amplitude that varies in accordance with the level of the output voltage, and the second saw wave has a constant amplitude based on a second reference voltage.

3. The PWM controller of claim 1, further comprising:
    a first current source for generating a current that varies in accordance with the level of the output voltage; and
    a second current source for generating a constant current based on a second reference voltage, wherein the first saw wave generator is coupled between the first current source and ground and generates the first saw wave with the variable current, and the second saw wave generator is coupled between the second current source and the peak hold circuit to generate the second saw wave with the constant current.

4. The PWM controller of claim 1, wherein the buck and boost converter includes:
    a first output transistor driven by the first pulse; and
    a second output transistor coupled to the first output transistor and driven by the second pulse.

5. A Pulse Width Modulation (PWM) controller for adjusting an output voltage of a buck and boost converter, the PWM controller comprising:
    a first saw wave generator, which generates a first saw wave including a first waveform portion formed in accordance with the level of the output voltage and a second waveform portion having a lower limit value that is a peak value of the first waveform portion of the first saw wave;
    a first comparator coupled to the first saw wave generator, which compares the first saw wave with a first reference voltage and generates a first pulse;
    a second saw wave generator, which generates a second saw wave including a first waveform portion formed in accordance with the level of the output voltage and a second waveform portion having a lower limit value that is a peak value of the first waveform portion of the second saw wave, the first waveform portion of the first saw wave being generated when the second waveform portion of the second saw wave is generated, and the first waveform portion of the second saw wave being generated when the second waveform portion of the first saw wave is generated; and
    a second comparator coupled to the second saw wave generator for comparing the second saw wave with the first reference voltage and generating a second pulse.

6. The PWM controller of claim 5, wherein the first waveform portions of the first and second saw waves each have a gradient that varies in accordance with the level of the output voltage, and the second waveform portions of the first and second saw waves each have a constant gradient based on a second reference voltage.

7. The PWM controller of claim 5, further comprising:
    a first current source that generates a variable current in accordance with the level of the output voltage; and
    a second current source that generates a constant current based on a second reference voltage;
    a first switch that selectively couples the first saw wave generator to one of the first current source and the second current source such that the first saw wave generator generates the first saw wave using one of the variable current and the constant current; and
    a second switch that selectively couples the second saw wave generator to one of the first current source and the second current source such that the second saw wave generator generates the second saw wave using one of the variable current and the constant current.

8. The PWM controller of claim 5, further comprising:
    a synthesizer coupled to the first and second comparators, which combines the first and second pulses to generate first and second synthesized pulses, wherein the first synthesized pulse is generated based on the first waveform portion of the first saw wave and the first waveform portion of the second saw wave, and the second synthesized pulse is generated based on the second waveform portion of the first saw wave and the second waveform portion of the second saw wave.

9. The PWM controller of claim 8, wherein the buck and boost converter includes:

a first output transistor driven by the first synthesized pulse; and a second output transistor coupled to the first output transistor and driven by the second synthesized pulse.

10. A buck and boost converter for generating an output voltage from an input voltage, the buck and boost converter comprising:
- a first output transistor;
- a second output transistor coupled to the first output transistor;
- an error amplifier coupled to the first and second output transistors, which generates an error voltage in accordance with a level of the output voltage; and
- a PWM controller, coupled to the error amplifier, for generating a first control pulse for driving the first output transistor and a second control pulse for driving the second output transistor;
- wherein the PWM controller generates the first control pulse based on the error voltage and a first reference voltage, and the PWM controller generates the second control pulse based on the error voltage, the first reference voltage, and a second reference voltage.

11. The buck and boost converter of claim 10, wherein the PWM controller includes:
- a first saw wave generator that generates a first saw wave in accordance with the error voltage;
- a first comparator, coupled to the first saw wave generator, for comparing the first saw wave with the first reference voltage and generating the first control pulse based on a output of the first comparator;
- a peak hold circuit, coupled to the first saw wave generator, for holding a peak value of the first saw wave;
- a second saw wave generator, coupled to the peak hold circuit, for generating a second saw wave having a lower limit value that is the peak value of the first saw wave; and
- a second comparator, coupled to the second saw wave generator, for comparing the second saw wave with the first reference voltage and generating the second control pulse based on an output of the second comparator.

12. The buck and boost converter of claim 11, wherein the first saw wave has an amplitude that varies in accordance with the error voltage, and the second saw wave has a constant amplitude based on the second reference voltage.

13. The buck and boost converter of claim 11, wherein the PWM controller further includes:
- a first current source that generates a variable current in accordance with error voltage; and
- a second current source that generates a constant current based on the second reference voltage;
- wherein the first saw wave generator is coupled between the first current source and ground to generate the first saw wave with the variable current, and the second saw wave generator is coupled between the second current source and the peak hold circuit to generate the second saw wave with the constant current.

14. The buck and boost converter of claim 10, wherein the PWM controller includes:
- a first saw wave generator that generates a first saw wave including a first waveform portion formed in accordance with the error voltage and a second waveform portion having a lower limit value that is a peak value of the first waveform portion of the first saw wave;
- a first comparator, coupled to the first saw wave generator, for comparing the first saw wave with a first reference voltage and generating a first pulse based on the comparison of the first saw wave with the first reference voltage;
- a second saw wave generator that generates a second saw wave including a first waveform portion formed in accordance with the error voltage and a second waveform portion having a lower limit value that is a peak value of the first waveform portion of the second saw wave, wherein the first waveform portion of the first saw wave is generated when the second waveform portion of the second saw wave is generated, and the first waveform portion of the second saw wave is generated when the second waveform portion of the first saw wave is generated;
- a second comparator, coupled to the second saw wave generator, for comparing the second saw wave with the first reference voltage and generating a second pulse based on the comparison of the second saw wave and the first reference voltage; and
- a synthesizer, coupled to the first and second comparators, for combining the first and second pulses to generate the first and second control pulses;
- wherein the first control pulse is generated based on the first waveform portion of the first saw wave and the first waveform portion of the second saw wave, and the second control pulse is generated based on the second waveform portion of the first saw wave and the second waveform portion of the second saw wave.

15. The buck and boost converter of claim 14, wherein the first waveform portions of the first and second saw waves each have a gradient that varies in accordance with the error voltage, and the second waveform portions of the first and second saw waves each have a constant gradient based on the second reference voltage.

16. The buck and boost converter of claim 14, wherein the PWM controller further includes:
- a first current source that generates a variable current in accordance with the error voltage; and
- a second current source that generates a constant current based on the second reference voltage;
- a first switch that selectively couples the first saw wave generator to one of the first current source and the second current source such that the first saw wave generator generates the first saw wave using one of the variable current and the constant current; and
- a second switch that selectively couples the second saw wave generator to one of the first current source and the second current source such that the second saw wave generator generates the second saw wave using one of the variable current and the constant current.

17. The buck and boost converter of claim 10, wherein the buck and boost converter operates in a boost mode in which the first control pulse controls activation and deactivation of the first output transistor, and the second control pulse keeps the second output transistor activated; and
- wherein the buck and boost converter operates in a buck mode in which the first control pulse keeps the first output transistor deactivated, and the second control pulse controls activation and deactivation of the second output transistor.

* * * * *